US008378034B2

(12) United States Patent
Pawlow et al.

(10) Patent No.: US 8,378,034 B2
(45) Date of Patent: Feb. 19, 2013

(54) ADDUCTS OF METATHESIS POLYMERS AND PREPARATION THEREOF

(75) Inventors: James H. Pawlow, Akron, OH (US); William L. Hergenrother, Akron, OH (US); Mark N. Dedecker, North Canton, OH (US); Daniel F. Graves, Canal Fulton, OH (US)

(73) Assignee: Firestone Polymers, LLC, Akron, OH (US)

( * ) Notice: Subject to any disclaimer, the term of this patent is extended or adjusted under 35 U.S.C. 154(b) by 575 days.

(21) Appl. No.: 12/535,449

(22) Filed: Aug. 4, 2009

(65) Prior Publication Data
US 2010/0029850 A1  Feb. 4, 2010

Related U.S. Application Data

(60) Provisional application No. 61/085,987, filed on Aug. 4, 2008.

(51) Int. Cl.
C08F 222/04 (2006.01)
C08F 222/06 (2006.01)
C08F 220/08 (2006.01)

(52) U.S. Cl. .................. 525/285; 525/386; 525/915

(58) Field of Classification Search .................. 525/285, 525/386, 915
See application file for complete search history.

(56) References Cited

U.S. PATENT DOCUMENTS

| 3,261,815 | A | 7/1966 | Dowbenko |
| 3,932,373 | A | 1/1976 | Calderon |
| 3,995,099 | A | 11/1976 | Gaylord |
| 4,391,737 | A | 7/1983 | Bell |
| 4,681,956 | A | 7/1987 | Schrock |
| 5,087,710 | A | 2/1992 | Schrock |
| 5,142,073 | A | 8/1992 | Schrock |
| 5,290,895 | A | 3/1994 | Wagener |
| 5,310,497 | A | 5/1994 | Ve Speer et al. |
| 5,312,940 | A | 5/1994 | Grubbs |
| 5,342,909 | A | 8/1994 | Grubbs |
| 5,439,992 | A * | 8/1995 | Yi et al. ................. 526/73 |
| 5,492,976 | A | 2/1996 | Shalati et al. |
| 5,728,917 | A | 3/1998 | Grubbs |
| 5,831,108 | A | 11/1998 | Grubbs |
| 5,880,231 | A | 3/1999 | Grubbs |
| 5,969,170 | A | 10/1999 | Grubbs |
| 6,083,585 | A | 7/2000 | Cahill et al. |
| 6,111,121 | A | 8/2000 | Grubbs |
| 6,211,391 | B1 | 4/2001 | Grubbs |
| 6,365,247 | B1 | 4/2002 | Cahill et al. |
| 6,624,265 | B2 | 9/2003 | Grubbs |
| 6,696,597 | B2 | 2/2004 | Pederson |
| 6,806,325 | B2 | 10/2004 | Grubbs et al. |
| 7,598,330 | B2 | 10/2009 | Grubbs et al. |
| 7,915,375 | B2 * | 3/2011 | Pawlow et al. ................. 528/271 |
| 2004/0097745 | A9 | 5/2004 | Grubbs |
| 2006/0173145 | A1 | 8/2006 | Pawlow |

FOREIGN PATENT DOCUMENTS

| JP | 56-038320 A | 4/1981 |
| WO | 2006127483 A1 | 11/2006 |

OTHER PUBLICATIONS

The Vestenamer PDF (May 16, 2004).*
Dragutan et al. Studies in Surface Science and Catalysis 2000, vol. 131.*
K.J. Irvin and J.C. Mol, Olefin Metathesis and Metathesis Polymerization, Academic Press, San Diego, CA, Chap. 11 (1997).
International Search Report, PCT/US2009/052703, dated Apr. 12, 2010; 4 pages.
Christopher W. Bielawski et al. "Living Ring-Opening Metathesis Polymerization", Jan. 2007 as cited in International Search Report (abstract attached); 2 pages.
Extended European Search Report dated Jan. 11, 2012 related to counterpart Application No. EP 09 805 439.8 based on International Appl. No. PCT/US2009/052703; 4 pages.
Watkins et al., "Ring Opening metathesis polymerization of cyclic alkenes containing heteroatoms". Macromol. Chem. Phys. 195, pp. 1147-1164 (1994).

* cited by examiner

*Primary Examiner* — Mark Kaucher
(74) *Attorney, Agent, or Firm* — Meredith E. Hooker; Arthur M. Reginelli

(57) ABSTRACT

Adducts of an unsaturated metathesis polymer or interpolymer and an unsaturated diacid anhydride. A process for producing adducts of an unsaturated metathesis polymer or interpolymer and an unsaturated diacid anhydride.

27 Claims, No Drawings

ADDUCTS OF METATHESIS POLYMERS AND PREPARATION THEREOF

RELATED APPLICATIONS

This application claims priority from U.S. Patent Application Ser. No. 61/085,987 filed Aug. 4, 2008, the entire disclosure of which is incorporated herein by reference.

BACKGROUND OF THE DISCLOSURE

Metathesis polymers are known in the prior art. However, there is a need for adducts of metathesis polymers that have use in various applications.

SUMMARY OF THE DISCLOSURE

The present disclosure relates to adducts of unsaturated metathesis polymerization-produced polymers and an unsaturated anhydride having the formula shown below:

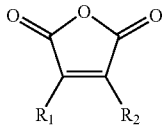

wherein $R_1$, and $R_2$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms. The adducts are characterized by having a number average molecular weight ($M_n$) of from about 1 to about 60 kg/mol, from about 2 to about 25 double bonds per 100 carbon atoms in the polymer chain, and from about 0.1 to about 33 weight percent of pendant anhydride groups, based on the adduct, and a cis content of greater than 50%.

In another embodiment, the adducts have a number average molecular weight ($M_n$) of about 1 to about 25 kg/mol, and in a still further embodiment, an $M_n$ of about 1 to 14 kg/mol, and still further 1-12 kg/mol, and 1-10 kg/mol, and 3-8 kg/mol.

In one or more embodiments, the adduct contains from about 5 to about 25 double bonds per 100 carbon atoms. In other embodiments, the adduct contains from about 6 to about 20 double bonds per 100 carbon atoms, in other embodiments from about 7 to about 18 double bonds per 100 carbon atoms, and in other embodiments, the adduct contains from about 10 to about 16 double bonds per 100 carbon atoms.

In another embodiment, the adducts have from about 0.1 to about 33 weight percent of pendant anhydride groups, based on the adduct. In another embodiment, the adducts have from about 1 to about 10 weight % pendant anhydride groups, and in another embodiment, from about 2 to about 10 weight %.

In another embodiment, the adducts have from 51% to 99% cis content, in another embodiment from about 52% to about 85% cis content, in another embodiment from about 52% to about 80% cis content, in another embodiment from about 52% to about 75% cis content, in another embodiment from about 52% to about 70% cis content in still another embodiment from about 52% to about 65% cis content, and in another embodiment from 53% to 65% cis content, and in another embodiment from 53% to 60% cis content, in still another embodiment from about 55% to about 75% cis content, in another embodiment from about 55% to about 70% cis content, in another embodiment greater than about 55% cis content, in another embodiment greater than about 60% cis content, in another embodiment greater than about 65% cis content, and in another embodiment greater than about 70% cis content.

DETAILED DESCRIPTION OF THE DISCLOSURE

The present disclosure relates to adducts of an unsaturated metathesis polymer and an unsaturated diacid anhydride having the formula shown below.

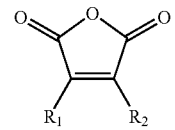

wherein $R_1$, and $R_2$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms.

The adducts are characterized by having a number average molecular weight ($M_n$) of from about 1 to about 60 kg/mol, from about 2 to about 25 double bonds per 100 carbon atoms in the polymer chain, from about 0.1 to about 33 weight percent of pendant anhydride groups, based on the adduct, and having a cis content of greater than 50%.

In another embodiment, the adducts have a number average molecular weight ($M_n$) of about 1 to about 25 kg/mol, and in still further embodiment, an $M_n$ of about 1 to about 14 kg/mol, and still further, about 1 to about 12 kg/mol, and about 1 to about 10 kg/mol, and about 3 to about 8 kg/mol.

In one or more embodiments, the adduct contains from about 5 to about 25 double bonds per 100 carbon atoms. In other embodiments, the adduct contains from about 6 to about 20 double bonds per 100 carbon atoms, in other embodiments from about 7 to about 18 double bonds per 100 carbon atoms, and in other embodiments, the adduct contains from about 10 to about 16 double bonds per 100 carbon atoms.

In another embodiment, the adducts have from 51% to 99% cis content, in another embodiment from about 52% to about 85% cis content, in another embodiment from about 52% to about 80% cis content, in another embodiment from about 52% to about 75% cis content, in another embodiment from about 52% to about 70% cis content in still another embodiment from about 52% to about 65% cis content, and in another embodiment from 53% to 65% cis content, and in another embodiment from 53% to 60% cis content, in still another embodiment from about 55% to about 75% cis content, in another embodiment from about 55% to about 70% cis content, in another embodiment greater than about 55% cis content, in another embodiment greater than about 60% cis content, in another embodiment greater than about 65% cis content, and in another embodiment greater than about 70% cis content.

In another embodiment, the adducts have from about 0.1 to about 33 weight percent of pendant anhydride groups, based on the adduct In another embodiment, the adducts have from about 0.5 to about 20 weight % pendant anhydride groups, in another embodiment, from about 2 to about 10 weight %, and in another embodiment from about 2 to about 8 weight % pendant anhydride groups.

The adducts may have a polydispersity index of greater than 1 to less than 6. In more detail, any metathesis produced polymer, including homopolymers and interpolymers, may be utilized in preparation of the adducts. Metathesis polymers, including interpolymers, are well known in the prior art. Regardless, the following is a description of typical known methods for producing the metathesis polymers.

The metathesis type polymerization process reaction may be ring opening metathesis polymerization (ROMP), acyclic diene metathesis polymerization (ADMET), or the like. In certain embodiments, high molecular weight unsaturated polymers may be modified (e.g., molecular weight reduction) by employing metathesis catalysts to provide unsaturated polymers. A functional olefin (i.e., an olefin including one or more functional groups) may be employed to yield unsaturated functional interpolymers or protected functional interpolymers.

Any catalyst capable of metathesis polymerization is useful in practicing the process. In one or more embodiments, the metathesis catalyst includes a transition metal carbene complex or a transition metal alkylidene complex. Suitable transition metal complexes include a positively charged metal center (e.g. in the +2, +4, or +6 oxidation state) that is penta- or hexa-coordinated. Exemplary transition metals include transition metals from Groups 3 to 12 of the Periodic Table, according to IUPAC conventions.

Metathesis catalysts that are also useful include tungsten and/or molybdenum-based metathesis catalysts. These catalysts include those that may be formed in situ from salts such as tungsten salts, and molybdenum and tungsten complexes known as Schrock's carbenes. Additionally, supported systems can be used, especially where gas-phase polymerization is employed. Tungsten-based metathesis catalysts are further described in U.S. Pat. Nos. 3,932,373, and 4,391,737, and Schrock catalysts are described in U.S. Pat. Nos. 4,681,956, 5,087,710, and 5,142,073.

In one or more embodiments, the metathesis catalyst includes a ruthenium-based or osmium-based metathesis catalyst. Any ruthenium-based or osmium-based metathesis catalyst that is effective for metathesis polymerization reactions can be used.

In one embodiment, the ruthenium-based or osmium-based metathesis catalysts includes carbene complexes of the type sometimes referred to as Grubbs catalysts. Grubbs metathesis catalysts are described in U.S. Pat. Nos. 5,312,940, 5,342,909, 5,831,108, 5,969,170, 6,111,121, 6,211,391, 6,624,265, 6,696,597 and U.S. Published App. Nos. 2003/0181609 A1, 2003/0236427 A1, and 2004/0097745 A9.

Ru— or Os-based metathesis catalysts include compounds that can be represented by the formula

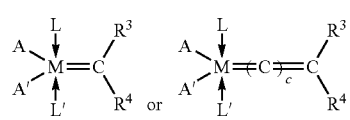

where M includes ruthenium or osmium, L and L' each independently include any neutral electron donor ligand, A and A' each independently include an anionic substituent, $R^3$ and $R^4$ independently comprise hydrogen or an organic group, and includes an integer from 0 to about 5, or where two or more of $R^3$, $R^4$, L, L', A, and A' combine to form a bidentate substituent.

In one embodiment, L and L' independently include phosphine, sulfonated phosphine, phosphite, phosphinite, phosphonite, arsine, stibine, ether, amine, amide, imine, sulfoxide, carboxyl, nitrosyl, pyridine, thioether, trizolidene, or imidazolidene groups, or L and L' may together include a bidentate ligand. In one embodiment, L and/or L' include an imidizolidene group that can be represented by the formulas

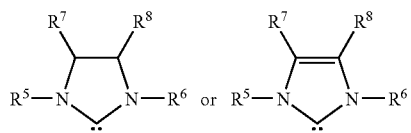

where $R^5$ and $R^6$ independently include alkyl, aryl, or substituted aryl. In one embodiment, $R^5$ and $R^6$ independently include substituted phenyls, and in another embodiment, $R^5$ and $R^6$ independently include mesityl. In one embodiment, $R^7$ and $R^8$ include alkyl or aryl, or form a cycloalkyl, and in another embodiment, are both hydrogen, t-butyl, or phenyl groups. Two or more of $R^5$, $R^6$, $R^7$ and $R^8$ can combine to form a cyclic moiety. Examples of imidazolidine ligands include 4,5-dihydro-imidazole-2-ylidene ligands.

In one embodiment, A and A' independently include halogen, hydrogen, $C_1$-$C_{20}$ alkyl, aryl, $C_1$-$C_{20}$ alkoxide, aryloxide, $C_2$-$C_{20}$ alkoxycarbonyl, arylcarboxylate, $C_1$-$C_{20}$ carboxylate, arylsulfonyl, $C_1$-$C_{20}$ alkylsulfonyl, $C_1$-$C_{20}$ alkylsulfinyl, each ligand optionally being substituted with $C_1$-$C_5$ alkyl, halogen, $C_1$-$C_5$ alkoxy, or with a phenyl group that is optionally substituted with halogen, $C_1$-$C_5$ alkyl, or $C_1$-$C_5$ alkoxy, and A and A' together may optionally include a bidentate ligand.

In one embodiment, $R^3$ and $R^4$ include groups independently selected from hydrogen, $C_1$-$C_{20}$ alkyl, aryl, $C_1$-$C_{20}$ carboxylate, $C_1$-$C_{20}$ alkoxy, aryloxy, $C_1$-$C_{20}$ alkoxycarbonyl, $C_1$-$C_{20}$ alkylthio, $C_1$-$C_{20}$ alkylsulfonyl and $C_1$-$C_{20}$ alkylsulfinyl, each of $R^3$ and $R^4$ optionally substituted with $C_1$-$C_5$ alkyl, halogen, $C_1$-$C_5$ alkoxy or with a phenyl group that is optionally substituted with halogen, $C_1$-$C_5$ alkyl, or $C_1$-$C_5$ alkoxy.

In one embodiment, L or L' and A or A' may combine to form one or more bidentate ligands. Examples of this type of complex are described as Class II catalysts in U.S. Pat. No. 6,696,597. In another embodiment, $R^3$ or $R^4$ and L or L' or A or A' may combine to form one or more bidentate ligands. This type of complex is sometimes referred to as Hoveyda or Hoveyda-Grubbs catalysts. Examples of bidentate ligands that can be formed by $R^3$ or $R^4$ and L or L' include ortho-alkoxyphenylmethylene ligands.

Other useful catalysts include hexavalent carbene compounds including those represented by the formula

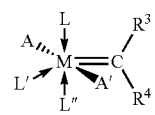

where M includes ruthenium or osmium, L, L', L" each independently include any neutral electron donor ligand, A, A', and A" each independently include an anionic substituent, and R³ and R⁴ independently comprise hydrogen or an organic group. In a manner similar to the penta-valent catalysts described above, one or more of the substituents in the hexa-valent complex may combine to form a bidentate substituent.

Examples of ruthenium-based carbene complexes include ruthenium, dichloro(phenylmethylene)bis(tricyclohexylphosphine), ruthenium, dichloro(phenylmethylene)bis(tricyclopentylphosphine), ruthenium, dichloro(3-methyl-2-butenylidene)bis(tricyclohexylphosphine), ruthenium, dichloro(3-methyl-2-butenylidene)bis(tricyclopentylphosphine), ruthenium, dichloro(3-phenyl-2-propenylidene)bis(tricyclohexylphosphine), ruthenium, dichloro(3-phenyl-2-propenylidene)bis(tricyclopentylphosphine), ruthenium, dichloro(ethoxymethylene)bis(tricyclohexylphosphine), ruthenium, dichloro(ethoxymethylene)bis(tricyclopentylphosphine), ruthenium, dichloro(t-butylvinylidene)bis(tricyclohexylphosphine), ruthenium, dichloro(t-butylvinylidene)bis(tricyclopentylphosphine), ruthenium, dichloro(phenylvinylidene)bis(tricyclohexylphosphine), ruthenium, dichloro(phenylvinylidene)bis(tricyclopentylphosphine), ruthenium,[2-(((2,6-bismethylethyl)-4-nitrophenyl)imino-kN)methyl-4-nitrophenolato-kO)]chloro-(phenylmethylene)(tricyclohexylphosphine), ruthenium,[2-(((2,6-bismethylethyl)-4-nitrophenyl)imino-kN)methyl-4-nitrophenolato-kO)]chloro-(phenylmethylene)(tricyclopentylphosphine), ruthenium,[2-(((2,6-bismethylethyl)-4-nitrophenyl)imino-kN)methyl-4-nitrophenolato-kO)]chloro-(3-methyl-2-butenylidene)(tricyclohexylphosphine), ruthenium,[2-(((2,6-bismethylethyl)-4-nitrophenyl)imino-kN)methyl-4-nitrophenolato-kO)]chloro-(3-methyl-2-butenylidene)(tricyclopentylphosphine), ruthenium,[1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(phenylmethylene), ruthenium, [1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(3-methyl-2-butenylidene), ruthenium, dichloro[1,3-dihydro-1,3-bis-(2,4,6-trimethylphenyl)-2H-imidazol-2-ylidene](phenylmethylene)(tricyclohexylphosphine), ruthenium, dichloro[1,3-dihydro-1,3-bis-(2,4,6-trimethylphenyl)-2H-imidazol-2-ylidene](phenylmethylene)(tricyclopentylphosphine), ruthenium, dichloro[1,3-dihydro-1,3-bis-(2,4,6-trimethylphenyl)-2H-imidazol-2-ylidene](3-methyl-2-butenylidene)(tricyclohexylphosphine), ruthenium, dichloro[1,3-dihydro-1,3-bis-(2,4,6-trimethylphenyl)-2H-imidazol-2-ylidene](3-methyl-2-butenylidene)(tricyclopentylphosphine), ruthenium, dichloro[1,3-dihydro-1,3-bis-(2,4,6-trimethylphenyl)-2H-imidazol-2-ylidene](3-phenyl-2-propenylidene)(tricyclohexylphosphine), ruthenium, dichloro[1,3-dihydro-1,3-bis-(2,4,6-trimethylphenyl)-2H-imidazol-2-ylidene](3-phenyl-2-propenylidene)(tricyclopentylphosphine), ruthenium, dichloro[1,3-dihydro-1,3-bis-(2,4,6-trimethylphenyl)-2H-imidazol-2-ylidene](ethoxymethylene)(tricyclohexylphosphine), ruthenium, dichloro[1,3-dihydro-1,3-bis-(2,4,6-trimethylphenyl)-2H-imidazol-2-ylidene](ethoxymethylene)(tricyclopentylphosphine), ruthenium, dichloro[1,3-dihydro-1,3-bis-(2,4,6-trimethylphenyl)-2H-imidazol-2-ylidene](t-butylvinylidene)(tricyclohexylphosphine), ruthenium, dichloro[1,3-dihydro-1,3-bis-(2,4,6-trimethylphenyl)-2H-imidazol-2-ylidene](t-butylvinylidene)(tricyclopentylphosphine), ruthenium, dichloro[1,3-dihydro-1,3-bis-(2,4,6-trimethylphenyl)-2H-imidazol-2-ylidene](phenylvinylidene)(tricyclohexylphosphine), ruthenium, dichloro[1,3-dihydro-1,3-bis-(2,4,6-trimethylphenyl)-2H-imidazol-2-ylidene](phenylvinylidene)(tricyclopentylphosphine), ruthenium,[1,3-bis-(2,4,6-trimethylphenyl)-2-imidazolidinylidene]-dichloro(phenylmethylene)(tricyclohexylphosphine), ruthenium,[1,3-bis-(2,4,6-trimethylphenyl)-2-imidazolidinylidene]-dichloro(phenylmethylene)(tricyclopentylphosphine), ruthenium,dichloro[1,3-bis-(2,4,6-trimethylphenyl)-2-imidazolidinylidene](3-methyl-2-butenylidene)(tricyclohexylphosphine), ruthenium,dichloro[1,3-bis-(2,4,6-trimethylphenyl)-2-imidazolidinylidene](3-methyl-2-butenylidene)(tricyclopentylphosphine), ruthenium,dichloro[1,3-bis-(2,4,6-trimethylphenyl)-2-imidazolidinylidene](3-phenyl-2-propylidene)(tricyclohexylphosphine), ruthenium, dichloro[1,3-bis-(2,4,6-trimethylphenyl)-2-imidazolidinylidene](3-phenyl-2-propylidene)(tricyclopentylphosphine), ruthenium,[1,3-bis-(2,4,6-trimethylphenyl)-2-imidazolidinylidene]-dichloro(ethoxymethylene)(tricyclohexylphosphine), ruthenium,[1,3-bis-(2,4,6-trimethylphenyl)-2-imidazolidinylidene]-dichloro(ethoxymethylene)(tricyclopentylphosphine), ruthenium,[1,3-bis-(2,4,6-trimethylphenyl)-2-imidazolidinylidene]-dichloro(t-butylvinylidene)(tricyclohexylphosphine), ruthenium,[1,3-bis-(2,4,6-trimethylphenyl)-2-imidazolidinylidene]-dichloro(t-butylvinylidene)(tricyclopentylphosphine), ruthenium,[1,3-bis-(2,4,6-trimethylphenyl)-2-imidazolidinylidene]-dichloro(phenylvinylidene)(tricyclohexylphosphine), and ruthenium,[1,3-bis-(2,4,6-trimethylphenyl)-2-imidazolidinylidene]-dichloro(phenylvinylidene)(tricyclopentylphosphine).

Commercially available Ru-based metathesis catalysts include ruthenium, dichloro(phenylmethylene)bis(tricyclohexylphosphine) (sometimes referred to as Grubbs First Generation Catalyst), ruthenium,[1,3-bis-(2,4,6-trimethylphenyl)-2-imidazolidinylidene]dichloro(phenylmethylene)(tricyclohexylphosphine) (sometimes referred to as Grubbs Second Generation Catalyst), ruthenium, dichloro[[2-(1-methylethoxy)phenyl]methylene](tricyclohexylphosphine), (sometimes referred to as Hoveyda-Grubbs First Generation Catalyst), and ruthenium, [1,3-bis(2,4,6-trimethylphenyl)-2-imidazolidinylidene]dichloro[[2,(1-methylethoxy)phenyl]methylene], (sometimes referred to as Hoveyda-Grubbs Second Generation Catalyst). These Ru-based metathesis catalysts are available from Materia Inc. (Pasadena, Calif.).

In one embodiment, the Ru-based or Os-based metathesis catalyst can be prepared in situ. For example, a Ru or Os compound can be combined with an alkyne and an appropriate ligand under known conditions to form a metal carbene complex such as those described above.

In one or more embodiments, useful olefin monomers include those that will undergo a metathesis reaction, i.e. those that include at least one metathesis-active double bond. The cycloolefins may be a cycloalkene or a cyclopolyene. Suitable examples of acyclic monomers include dienes, alpha omega dienes, oligomers of olefins, and the like.

In certain embodiments, the olefin is a mixture of two or more different olefins that differ in at least one aspect such as the number of carbon atoms or heteroatoms and the amount and kind of substituents. Two or more different olefins may also refer to two or more olefinic isomers. In one embodiment, the ratio of first olefin to second olefin is from about 99:1 to 1:99, in another embodiment from about 95:5 to 5:95, and in yet another embodiment from about 90:10 to 10:90. In the instance where ROMP is used, the cycloolefin includes a mixture of two or more cycloolefins that differ in ring size or in substituents, or a mixture of two or more isomers of cycloolefins. Any combination of two or more cycloolefins can be used that provides the desired polymer properties, as discussed below. In one embodiment, the mixture includes 1,5-cyclooctadiene and cyclopentene, in other embodiments 1,5-cyclooctadiene and cyclooctene, and in still other embodiments cyclooctene and cyclopentene. Any cycloolefin that can participate in a ring-opening metathesis polymerization (ROMP) reaction may be used. The cycloolefin may include one or more substituent groups and/or functional groups. The cycloolefin may be a cycloalkene or a cyclopolyene.

Cycloolefins include compounds represented by the formula

where z includes an integer from 1 to about 18. Examples of cycloolefins include cyclopropene, cyclobutene, benzocyclobutene, cyclopentene, dicyclopentadiene, norbornene, norbornadiene, cycloheptene, cyclooctene, 7-oxanorbornene, 7-oxanorbornadiene, cyclodecene, 1,3-cyclooctadiene, 1,5-cyclooctadiene, 1,3-cycloheptadiene, [2.2.1]bicycloheptenes, [2.2.2]bicyclooctenes, cyclohexenylnorbornenes, norbornene dicarboxylic anhydrides, cyclododecene, 1,5,9-cyclododecatriene, and derivatives thereof. In one embodiment, the cycloolefin is cyclopentene, cyclooctene, 1,3-cyclooctadiene, 1,5-cyclooctadiene, 1,5,9-cyclododecatriene, or mixtures thereof. It will be recognized by those of skill in the art that the thermodynamics of ring-opening polymerization varies based upon factors such as ring size and substituents. Ring-opening metathesis is described in K. J. Irvin and J. C. Mol, *Olefin Metathesis and Metathesis Polymerization*, Chap. 11 (1997).

An acyclic alkene including a functional group may be present during the polymerization or added to the polymerization mixture. The functional alkene, which may also be referred to as a functionalizing agent, includes at least one metathesis-active double bond. The acyclic alkene includes functional end-groups. The above may be represented by the formula

where Z includes a functional group and n includes an integer from 0 to about 20. A mixture of two or more functionalized alpha olefins may be used, and can be represented by the formula

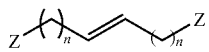

where each Z, which may be the same or different, is a functional group and n is an integer from 0 to about 20, in another embodiment, n is an integer from about 1 to about 9, in yet another embodiment, n is an integer less than about 6. In addition to providing functionalization, these functional alkenes may also be used to control the molecular weight of the metathesis polymer during polymerization.

In one or more embodiments, the glass transition temperature of the methathesis polymer is less than −75° C., in another embodiment less than about −77° C., in another embodiment less than about −80° C., and in still another embodiment less than about −85° C.

The synthetic techniques employed to prepare the metathesis polymers, including interpolymers, include conventional metathesis polymerization techniques. These reactions may include ring-opening metathesis polymerization (ROMP) and/or acyclic diene metathesis polymerization (ADMET); these reactions are known in the art as set forth in U.S. Pat. Nos. 5,728,917 and 5,290,895, and 5,969,170. Metathesis polymers can also be prepared by the metathesis depolymerization of higher molecular weight unsaturated polymers (see WO2006/127483 A1). The use of functional alkenes, including multi-functional alkenes, in metathesis reaction, is also known and disclosed as U.S. Pat. No. 5,880,231 and U.S. Ser. No. 11/344,660.

In one or more embodiments, the reactants and catalysts are introduced in an inert atmosphere. The order of reactant or catalyst addition is not limited. In one embodiment, two or more metathesis-active olefin monomers are combined to form a mixture, and then the metathesis catalyst is added to the mixture. One or more of the materials may be introduced together with a solvent.

Metathesis polymerization reactions typically occur at temperatures that are below the ceiling temperature of the monomers. In one embodiment, the metathesis reaction occurs at a temperature of from minus 40° C. to about 100° C., in another embodiment, the temperature is from about minus 20° C. to about 75° C., in yet another embodiment, the temperature is from about 0° C. to about 55° C.

The progress of the reaction can optionally be monitored by standard analytical techniques. The metathesis reaction may optionally be terminated by adding a catalyst deactivator, such as ethyl vinyl ether.

After reaction, the metathesis-polymerized polymer may be isolated from the solvent using conventional procedures. In one or more embodiments, especially where the functional groups are sensitive to water, known techniques can be used to prevent or diminish contact with water.

In producing a polymer, the amount of monomer(s) and optionally acyclic alkene, that are employed in the metathesis reaction is not particularly limited. Advantageously, the molar ratio of the acyclic alkene to the monomers can be selected to adjust the molecular weight of the polymer. For example, a molecular weight of about 1 kg/mol to about 10 kg/mol can be obtained when the molar ratio of acyclic alkene to the monomers is from about 1:9 to about 1:150.

For polymerization of interpolymers, the relative amount of each monomer is not limited. In one embodiment, the ratio of first monomer to second monomer is from about 99:1 to about 1:99, in another embodiment, the ratio of first monomer to second monomer is from about 95:5 to about 5:95, in yet another embodiment, the ratio of first monomer to second monomer is from about 90:10 to about 10:90.

The amount of metathesis catalyst employed in the metathesis reaction is not critical, however a catalytic amount of catalyst is typically employed. In one embodiment, the amount of catalyst is at least about 0.1 mmol catalyst per 100 moles olefin, in other embodiments at least about 1 mmol catalyst per 100 moles olefin, in other embodiments, the amount of catalyst is from about 5 mmol to about 10 moles catalyst per 100 moles olefin, and still other embodiments from about 10 mmol to about 1 moles catalyst per 100 moles olefin, and yet another embodiment about 0.02 to about 0.5 moles catalyst per 100 moles olefin. In other embodiments, metathesis catalysis can be employed in conjunction with existing high molecular weight metathesis polymers to form the desired polymers of this invention. In other words, metathesis catalysis can be employed to prepare polymer of a desired molecular weight by introducing the catalyst to unsaturated high molecular weight polymer and acyclic alkene. The high molecular weight polymer that can be used in this process includes high molecular weight polymer produced by metathesis polymerization. For example, high molecular weight polymer resulting from the polymerization of cyclooctene having a molecular weight of about 90 kg/mole, less than 1% pendant vinyl, and about 12 to about 15 double bonds per 100 carbon atoms in the polymer chain are commercially available under the tradename Vestenamer™ (Degussa). These polymers can be contacted with a metathesis catalyst and an acyclic alkene to produce a lower molecular weight metathesis polymer. Also, by employing functionalized acyclic alkenes, the resulting metathesis polymer can be end-functionalized. Optionally, a cycloolefin or diene containing a metathesis-reactive double bond can be added to copolymerize with the base polymer and thereby form an interpolymer having at least one or more terminal functional groups.

The unsaturated metathesis polymer used herein has a Mn of about 1 to about 40 kg/mol, and has about 2 to about 25 double bonds per 100 carbon atoms. The polymers may have a polydispersity index of greater than 1 to less than 6. In one embodiment, the polymers may have a cis content of about greater than 51%, or from about 55% to about 70% or greater than about 55%.

Any of the metathesis polymers including homopolymers or interpolymers may be utilized in producing adducts herein. The metathesis polymers or interpolymers adducted from about 0.1 to about 33 weight % unsaturated diacid anhydride are characterized by having a number average molecular weight ($M_n$) of about 1 to about 60 kg/mol, and about 2 to about 25 double bonds per 100 carbon atoms in the polymer chain. The adducts may have a polydispersion index of greater than 1 to less than 6.

In another embodiment, the adducts have a number average molecular weight ($M_n$) of about 1 to about 25 kg/mol, and in a still further embodiment, an $M_n$ of about 1 to about 14 kg/mol, and further yet, an $M_n$ of about 1 to about 12, about 1 to about 10, and 3 about 8 kg/mol.

In one or more embodiments, the adducts contain from about 5 to about 25 double bonds per 100 carbon atoms. In other embodiments, the adduct contains from about 6 to about 20 double bonds per 100 carbon atoms, in other embodiments from about 7 to about 18 double bonds per 100 carbon atoms, and in other embodiments, the adduct contains from about 10 to about 16 double bonds per 100 carbon atoms.

In another embodiment, the adducts have about 0.1 to about 33 weight %, and in another embodiment, from about 1 to about 10 weight percent of pendant anhydride groups, based on the adduct, and still further about 2 to about 10% by weight. In another embodiment, the adducts have from about 2 to about 4 weight % pendant anhydride groups.

In another embodiment, the adducts have from 51% to 99% cis content, in another embodiment from about 52% to about 85% cis content, in another embodiment from about 52% to about 80% cis content, in another embodiment from about 52% to about 75% cis content, in another embodiment from about 52% to about 70% cis content in still another embodiment from about 52% to about 65% cis content, and in another embodiment from 53% to 65% cis content, and in another embodiment from 53% to 60% cis content, in still another embodiment from about 55% to about 75% cis content, in another embodiment from about 55% to about 70% cis content, in another embodiment greater than about 55% cis content, in another embodiment greater than about 60% cis content, in another embodiment greater than about 65% cis content, and in another embodiment greater than about 70% cis content.

In another embodiment, the adduct may have a melting point of less than 40° C., in another embodiment less than about 30° C., in another embodiment less than about 25° C., and in another embodiment less than about 10° C. In another embodiment, the polymer has a melting point in the range of about 0° C. to about 25° C., in another embodiment from about 5° C. to about 20° C.

In another embodiment, the adducts have a crystallinity of less than 10%, in another embodiment less than about 8%, in another embodiment less than about 7%, in another embodiment less than about 5%, and in another embodiment less than about 3%.

The adducts may be prepared by reacting the metathesis polymers with from about 0.1 to about 50 weight % unsaturated diacid anhydride, based on the weight of the polymer. The reaction may be any technique that will cause reaction of the metathesis polymer with the unsaturated diacid anhydride to occur.

Exemplary of the techniques that may be used in reacting the metathesis polymer with the unsaturated diacid anhydride are the ene reaction process and the radical addition process. These techniques are described as follow: The ene reaction is a site-specific organic chemistry reaction between an alkene containing an allylic hydrogen (the ene) and a compound containing an activated double bond (the enophile). The reactive ene double bond can be present on a small molecule such as a monomer, or on a polymer (backbone or pendant group). The reaction is usually catalyzed by thermal energy or by the presence of a Lewis acid such as $BF_3$, $AlCl_3$. The product of the ene reaction is a substituted alkene or an adduct with the double bond shifted one carbon to the allylic position.

The ene reaction is performed by mixing or blending an unsaturated metathesis polymer, neat or in solution, with an unsaturated diacid anhydride (about 0.1-50 weight percent based on polymer). The reaction contents are heated in a reaction vessel or in an extruder at a temperature range of about 160-240° C. for about 0.1-24 hours or until spectroscopic analyses indicated the desired level of adduct has been formed.

Alternatively, the adduct can be prepared by employing a radical initiator such as di-tert-butyl peroxide, dicumyl peroxide α,α-azoisobutyronitrile (AIBN), and tert-butyl peroxybenzoate, in combination with a metathesis polymer, neat or in solution, and an unsaturated diacid anhydride (about 0.1 to about 50 weight percent based on the polymer). The reaction may be carried out at a temperature ranging from about 50 to about 150° C. Optionally, a radical inhibitor or an antioxidant may be employed.

Examples of other suitable radical initiators are well known. These include one, or a mixture of diacyl peroxides such as benzoyl peroxide, 2,4-dichlorobenzoyl peroxide, octanoyl peroxide and lauroyl peroxide, dialkyl peroxides such as di-t-butyl peroxide, 2,5-dimethyl-2,5-di(t-butylperoxy)hexane-3, dicumyl peroxide and α,α'bis(t-butyl peroxy-m-isopropyl)benzene; peroxy esters such as t-butyl perbenzoate, t-butyl peroxy-m-isopropyl)benzene; peroxy esters such as t-butyl perbenzoate, t-butyl peracetate, di-t-butyl perphthalate and 2,5-dimethyl-2,5-di(benzoylperoxy)hexane; ketone peroxides such as methyl ethyl ketone peroxide and cyclohexanone peroxide; hydroperoxides such as di-t-butyl hydroperoxide, cumene hydroperoxide, α-phenylethyl hydroperoxide and cyclohexenyl hydroperoxide; and peroxy ketals such as 1,1-bis(t-butylperoxy)cyclohexane and 1,1-bis (t-butylperoxy)-3,3,5-trimethylcyclohexane. The amounts typically used range from about 0.001-0.5 weight %.

Examples of useful unsaturated anhydrides include those having the formula shown below.

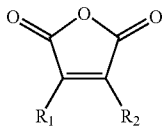

wherein $R_1$, and $R_2$ are the same or different, and are selected from hydrogen or a monovalent organic group. In one or more embodiments, the monovalent organic groups may include hydrocarbyl groups or substituted hydrocarbyl groups such as, but not limited to, alkyl, cycloalkyl, substituted cycloalkyl, aryl, substituted aryl, aralkyl, alkaryl, with each group having from 1 to 30 carbon atoms. The hydrocarbyl groups may contain heteroatoms such as, but not limited to, nitrogen, boron, oxygen, silicon, sulfur, and phosphorus atoms.

Such unsaturated diacid anhydrides include, but are not limited to, maleic anhydride, citraconic anhydride, itaconic anhydride, glutaconic anhydride, crotonic anhydride, 3,4,5,6-tetrahydrophthalic anhydride, 2,3-dimethylmaleic anhydride, bromomaleic anhydride, chloromaleic anhydride, dibromomaleic anhydride, and dichloromaleic anhydride. In one embodiment, the diacid anhydride is maleic anhydride.

While certain representative embodiments and details have been shown for the purpose of illustrating the invention, it will be apparent to those skilled in the art that various changes and modifications may be made therein without departing from the spirit or the scope of the invention.

We claim:

1. An adduct of an unsaturated metathesis polymer or interpolymer and an unsaturated diacid anhydride having the formula:

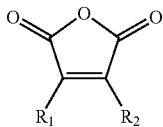

wherein $R_1$ and $R_2$ are the same or different, and are selected from hydrogen or a monovalent organic group, wherein the adduct is characterized by having a number average molecular weight ($M_n$) of from about 1 to about 60 kg/mol, from about 2 to about 25 double bonds per 100 carbon atoms in the polymer chain, from about 0.1 to about 33 weight percent of pendant anhydride groups, based on the adduct, and having a cis content of 52 to 70%, a melting point of less than 10° C. and a crystallinity of less than 5%.

2. The adduct of claim 1, wherein the number average molecular weight ranges from about 1 to about 25 kg/mol.

3. The adduct of claim 2, wherein the number average molecular weight ranges from about 1 to about 14 kg/mol.

4. The adduct of claim 3, wherein the number average molecular weight ranges from about 3 to about 8 kg/mol.

5. The adduct of claim 1, wherein the pendant anhydride groups are present in an amount ranging from about 1 to about 10 weight percent.

6. The adduct of claim 5, wherein the pendant anhydride groups are present in an amount ranging from about 2 to about 10 weight percent.

7. The adduct of claim 6, wherein the pendant anhydride groups are present in an amount ranging from about 2 to about 4 weight percent.

8. The adduct of claim 1, further characterized by having about 6 to about 20 double bonds per 100 carbon atoms.

9. The adduct of claim 8, having about 7 to about 18 double bonds per 100 carbon atoms.

10. The adduct of claim 9, having about 10 to about 16 double bonds per 100 carbon atoms.

11. The adduct of claim 1, further characterized by having a polydispersity index of greater than 1 to less than 6.

12. The adduct of claim 1, wherein the unsaturated diacid anhydride is maleic anhydride.

13. The adduct of claim 1, wherein the unsaturated diacid anhydride is maleic anhydride, the number average molecular weight ranges from about 3 to about 8 kg/mol, the pendant anhydride groups are present in an amount ranging from about 2 to about 10 weight %, the polydispersity index is greater than 1 to less than 6, and the cis content is from about 55% to about 70%.

14. The adduct of claim 1, wherein the unsaturated metathesis polymer or interpolymer is polymerized from monomers selected from the group consisting of cyclopentene, cyclooctene, 1,3-cyclooctadiene, 1,5-cyclooetadiene, 1,5,9-cyclododecatriene, or mixtures thereof.

15. The adduct of claim 1, wherein the cis content is from 52% to about 65%.

16. The adduct of claim 1, wherein the cis content is from 52% to 65%.

17. The adduct of claim 1, wherein the cis content is from 53% to 60%.

18. The adduct of claim 1, wherein the cis content is from about 55% to 70%.

19. The adduct of claim 1, wherein the cis content is from 55% to 70%.

20. A process for preparing an adduct of an unsaturated metathesis polymer or interpolymer and an unsaturated diacid anhydride having the

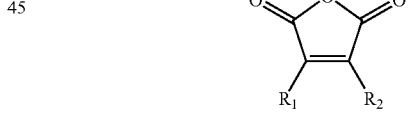

wherein $R_1$ and $R_2$ are the same or different, and are selected from hydrogen or a monovalent organic group, and wherein the adduct is characterized by having a number average molecular weight ($M_n$) of from about 1 to about 60 kg/mol, from about 2 to about 25 double bonds per 100 carbon atoms in the polymer chain, having a cis content of 52 to 70%, from about 0.1 to about 33 weight percent of pendant anhydride groups, based on the adduct, and melting point of less than 10° C, and a crystallinity of less than 5%, comprising reacting an unsaturated metathesis polymer or interpolymer with an amount of about 0.1 to about 50 weight percent of the anhydride, based on the polymer.

21. The process of claim 20, wherein the adduct has a cis content of about 55% to 70%.

22. The process of claim 21, wherein the pendant anhydride groups are present in an amount of about 2 to about 10 weight percent.

23. The process of claim 20, wherein the number average molecular weight ranges from about 1 to about 14 kg/mol.

24. The adduct of claim 20, wherein the diacid anhydride is maleic anhydride.

25. The process of claim 20, wherein the pendant anhydride groups are present in the adduct in an amount of about 1 to about 10 weight percent.

26. The process of claim 20, where the adduct is characterized by a crystallinity of less than 3%.

27. The adduct of claim 1, where the adduct is characterized by a crystallinity of less than 3%.

* * * * *